US012409733B2

(12) United States Patent
Zazzaro et al.

(10) Patent No.: US 12,409,733 B2
(45) Date of Patent: Sep. 9, 2025

(54) RAILWAY VEHICLE PROVIDED WITH A PANTOGRAPH AND WITH A CONTROL SYSTEM FOR RAISING/LOWERING SUCH PANTOGRAPH

(71) Applicant: HITACHI RAIL STS S.P.A., Naples (IT)

(72) Inventors: Salvatore Zazzaro, Naples (IT); Vittorio Rota, Naples (IT); Giuseppe Graber, Naples (IT)

(73) Assignee: HITACHI RAIL STS S.P.A., Naples (IT)

( * ) Notice: Subject to any disclaimer, the term of this patent is extended or adjusted under 35 U.S.C. 154(b) by 139 days.

(21) Appl. No.: 17/908,183

(22) PCT Filed: Mar. 2, 2021

(86) PCT No.: PCT/IB2021/051731
§ 371 (c)(1),
(2) Date: Aug. 30, 2022

(87) PCT Pub. No.: WO2021/176351
PCT Pub. Date: Sep. 10, 2021

(65) Prior Publication Data
US 2023/0071247 A1    Mar. 9, 2023

(30) Foreign Application Priority Data
Mar. 2, 2020    (IT) .................... 102020000004342

(51) Int. Cl.
*B60L 3/00*       (2019.01)
*B60L 5/18*       (2006.01)
(Continued)

(52) U.S. Cl.
CPC ............... *B60L 3/0015* (2013.01); *B60L 5/18* (2013.01); *B60M 1/28* (2013.01); *B60M 7/003* (2013.01);
(Continued)

(58) Field of Classification Search
CPC ...... B60L 3/0015; B60L 5/18; B60L 2200/26; B60M 1/28; B60M 7/003; B61L 15/0081; B61L 23/041; B61L 25/025
See application file for complete search history.

(56) References Cited

U.S. PATENT DOCUMENTS 6,864,598 B2   3/2005  Akstin
8,742,616 B1 * 6/2014  Dehlsen ............... B61C 17/06
                                              307/9.1
(Continued)

FOREIGN PATENT DOCUMENTS

DE    19940350 A1    5/2001
DE    102010053528 A1    5/2012
(Continued)

OTHER PUBLICATIONS

International Preliminary Report on Patentability in PCT Application No. PCT/IB2021/051731 mailed Oct. 7, 2022 (15 pages).
(Continued)

*Primary Examiner* — Behrang Badii
(74) *Attorney, Agent, or Firm* — Leason Ellis LLP

(57) ABSTRACT

A railway vehicle is provided with a pantograph movable under the action of a moving device between a raised position, in which it is able to cooperate in contact, in use, with a catenary conductor cable for drawing electrical energy, and a lowered position, in which it is lower than the height where, in use, such catenary is provided; the vehicle is provided with a battery pack and a control system for controlling the moving device and therefore lowering/rais-
(Continued)

ing the pantograph; the control system has a microprocessor control unit configured to control the moving device in response to signals containing information indicative of the actual position of the vehicle, and/or indicative of the presence or absence of the conductor cable in the vicinity of the vehicle.

12 Claims, 3 Drawing Sheets

(51) Int. Cl.
    *B60M 1/28*     (2006.01)
    *B60M 7/00*     (2006.01)
    *B61L 15/00*     (2006.01)
    *B61L 23/04*     (2006.01)
    *B61L 25/02*     (2006.01)

(52) U.S. Cl.
    CPC ......... *B61L 15/0081* (2013.01); *B61L 23/041* (2013.01); *B61L 25/025* (2013.01); *B60L 2200/26* (2013.01)

(56) References Cited

U.S. PATENT DOCUMENTS

2010/0154174 A1* 6/2010 Haab ............... E05F 15/605
    49/358

2016/0114701 A1* 4/2016 Heinen ............... B60M 7/003
    191/2
2017/0243357 A1* 8/2017 Peng ............... B60M 1/28
2024/0025263 A1* 1/2024 Borchardt ............... B60L 5/39

FOREIGN PATENT DOCUMENTS

| DE | 102012209311 A1 | 12/2013 |
|---|---|---|
| EP | 3115253 A2 | 1/2017 |
| JP | 2010-183802 A | 8/2010 |
| JP | 2012144068 A | 8/2012 |
| JP | 2016-534696 A | 11/2016 |
| WO | 2016/051468 A1 | 8/2017 |

OTHER PUBLICATIONS

International Search Report and Written Opinion in PCT Application No. PCT/IB2021/051731 mailed Jan. 25, 2022 (23 pages).
A Landi et al: "Hough transform and thermo-vision for monitoring pantograph-catenary system", Proceedings of the Institution of Mechanical Engineers. Part F, Journal of Rail and Rapid Transit, vol. 220, No. 4, Jul. 1, 2006 (Jul. 1, 2006), pp. 435-447, XP55339088, GB ISSN: 0954-4097, DOI: 10.1243/0954409JRRT41 p. 438, left-hand column, paragraph 3 figure 2.
Written Opinion of the International Preliminary Examining Authority in PCT Application No. PCT/IB2021/051731, mailed Jul. 29, 2022 (11 pages).
Notice of Reasons for Rejection in JP Application No. 2022-552919, mailed Oct. 29, 2024, an English Translation attached hereto (17 pages).

* cited by examiner

RAILWAY VEHICLE PROVIDED WITH A PANTOGRAPH AND WITH A CONTROL SYSTEM FOR RAISING/LOWERING SUCH PANTOGRAPH

CROSS-REFERENCE TO RELATED APPLICATIONS

This patent application is a U.S. National Phase Application under 35 U.S.C. § 371 of International Patent Application No. PCT/IB2021/051731, filed on Mar. 2, 2021, which claims priority from Italian patent application no. 102020000004342, filed on Mar. 2, 2020, the entire disclosure of which is incorporated herein by reference.

TECHNICAL FIELD

The present invention relates to a railway vehicle, in particular a vehicle provided with a pantograph and a control system for raising/lowering said pantograph, to which the following description will refer without thereby losing generality.

BACKGROUND ART

In recent applications, trams can be equipped with a battery pack to accumulate electrical energy on board, as well as with a pantograph for drawing electrical energy from a catenary electrical cable. The electrical energy of the battery pack and that drawn from the catenary electrical cable can be used, alternatively to each other, to power an electric motor drive system. The provision of a battery pack allows the tram to travel both along line sections where the catenary is present, and along line sections that are not electrified. In particular, in city historic centres, it is increasingly common to tend to avoid using overhead elements, such as the catenary, which could compromise the aesthetic value of the historic centre and/or could have considerable technical complexity as regards the installation and/or the powering.

For safety reasons, during the journey along the line, the need is felt to lower the pantograph of the tram when travelling along a line section lacking the catenary.

For this purpose, in known solutions, the pantograph is raised and lowered by means of a special command from the driver. In other words, in currently commercially available vehicles, the raising/lowering procedure is manual.

Generally, the driver is unable to see the catenary, except in an approximate manner, from a distance and/or with difficulty (also depending on the weather conditions). Moreover, the driver does not necessarily know the line he/she is travelling on (i.e., it is not required of him/her to know which are the electrified and non-electrified sections along the tram line on which he/she operates). Therefore, in order to decide whether and when raising/lowering the pantograph, in known solutions, the driver must interpret information provided on appropriate signals or signs which are arranged along the tram route, or he/she must be informed in advance by an operating centre about the stops where it is necessary to intervene by lowering and raising the pantograph.

This need to provide information to the driver can clearly generate errors of interpretation and/or communication defects, and therefore errors in controlling the movement of the pantograph, with consequent risks of damaging the catenary and/or the pantograph itself, or with risk of depleting the energy stored by the battery pack if the pantograph is kept lowered more than necessary.

An exemplary device for lowering the pantograph automatically is included in document DE 199 40 350 which discloses a method and apparatus for monitoring external factors causing obstacles on a catenary; such method and apparatus are suitable for use in electric railway vehicles employing and/or comprising an image recording unit and an evaluation unit, the latter for comparing an instant image with an image previously acquired and recorded in the same location, in order to identify the presence of unwanted objects around the catenary, which can represent dangerous conditions, in order to lower the pantograph and avoid damage.

The prior art described in this document does not fit the object of the present invention.

In fact, the method and the apparatus described in document DE 199 40 350 do not allow the catenary to be actively recognized but compare images so as to search differences between such images in order to identify a danger/obstacle along the catenary. This comparison does not detect any differences with respect to the catenary, which would either be present in both images or absent in both images. In other words, the device described in document DE 199 40 350 does not perform any checks on the catenary.

Moreover, this prior art solution is not equipped with alternative power supply in order to guarantee propulsion along the sections where the pantograph is lowered.

Furthermore, document DE 199 40 350 does not provide safety measures when the pantograph is being detached from the catenary, since such detachment is carried out occasionally and in emergency conditions.

EP3115253A2 discloses a solution in which the vehicle driver requests that the pantograph is raised. After this request, a radar sensor checks whether there is an overhead line above the vehicle. If this check has a positive outcome, the pantograph is enabled to move up, until contact is made with the overhead line. If the presence of the overhead line is not detected by the radar sensor, raising of the pantograph is blocked.

DE102012209311A1 discloses a method for locating the position of a train within a rail network.

DISCLOSURE OF INVENTION

The object of the present invention is to provide a railway vehicle, which allows the above problems to be solved in a simple and inexpensive way.

According to the present invention, a railway vehicle is provided as defined in the appended claims.

BRIEF DESCRIPTION OF THE DRAWINGS

The invention will now be described with reference to the accompanying drawings, which illustrate some non-limiting embodiments thereof, in which.

BEST MODE FOR CARRYING OUT THE INVENTION

Figure 1:
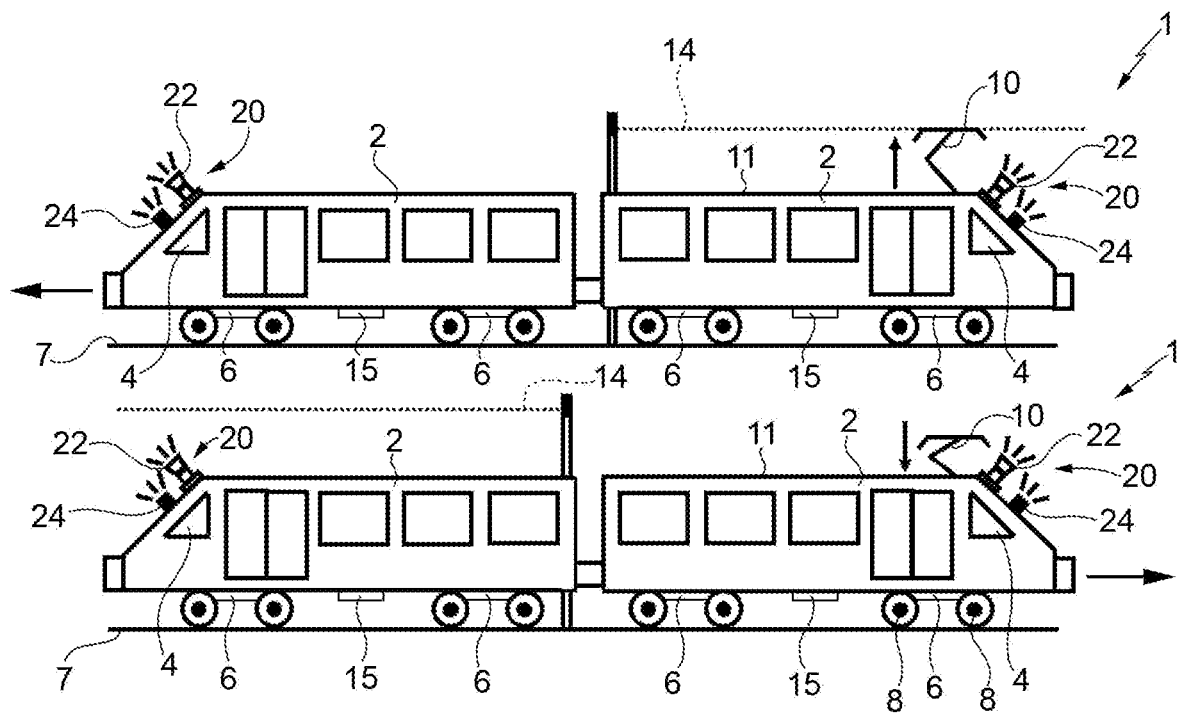
FIG. 1 is a schematic side view, which relates to a first preferred embodiment of the railway vehicle according to the present invention and shows two configurations in which a pantograph of the vehicle is arranged in a raised position and in a lowered position, respectively.

In FIG. 1, the reference numeral 1 indicates a railway vehicle (shown schematically) comprising at least one carriage 2 having a driver's cab 4 suitable to accommodate a driver and provided with a control panel 5 (shown schematically in FIG. 2) to enable the driver to drive the vehicle 1 and to monitor and operate accessories and devices placed on board. The driver's cab 4 is arranged at one end of the carriage 2. In the specific example shown herein, the vehicle 1 consists of two carriages 2 connected to each other in an articulated manner. In particular, the vehicle 1 has two driving positions 4, arranged at the opposite ends of the vehicle 1 (i.e., at the head and tail), so that it can be driven in both travel directions.

The carriage 2 comprises one or more trolleys 6 with wheels which are coupled to tracks or rails 7 and are driven by electric drive motors 8, shown schematically, to travel along at least one line or route defined by the tracks 7. Specifically, the vehicle 1 is defined by a tram.

Figure 2:
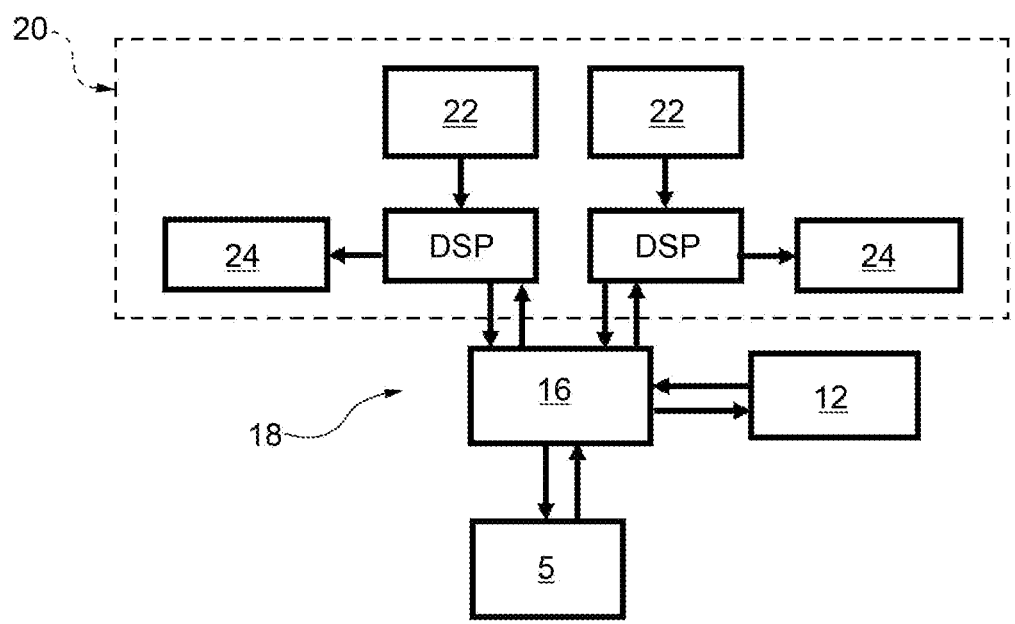
FIG. 2 is a block diagram relating to a control system of the vehicle in FIG. 1.

The vehicle 1 comprises a pantograph 10, arranged on a roof 11 of one of the carriages 2, and a motorized moving device 12, schematically shown in FIG. 2, which can be controlled to move the pantograph 10 with respect to the roof 11 between a raised position, where the pantograph 10 is in contact with a catenary conductor cable (i.e., an overhead power supply cable), designated by the reference numeral 14, and a lowered position, where the pantograph 10 is arranged lower than the height at which the conductor cable 14 is arranged. The pantograph 10 draws electrical energy from the conductor cable 14, in a known manner, in order to power the electric drive motors 8.

This conductor cable 14 is only provided along a part of the line on which the vehicle 1 is to travel, whereas another part is not electrified. To compensate for the lack of electrical energy in the non-electrified part of the line, the vehicle 1 comprises an additional electrical energy source 15, for driving the electric drive motors 8 as an alternative to the energy supplied by the pantograph 10. This additional source 15 comprises, in particular, a battery pack. In conjunction with, or as an alternative to, the battery pack, said additional source 15 comprises an assembly defined by a heat engine and an electric generator, or a fuel cell, or a super-capacitor. Therefore, where the conductor cable 14 is absent, the electric drive motors 8 are equally powered, continuously throughout the line.

As schematically shown in FIG. 2, the vehicle 1 comprises a control system 18 which includes a microprocessor control unit 16 programmed so as to control the device 12 (i.e., to raise and lower the pantograph 10) and so as to control a switching of the power supply between the pantograph 10 and the additional source 15. The unit 16 emits control signals (for the device 12 and the switching of the power supply) automatically, in response to information indicative of:

- the presence or absence of the conductor cable 14 along the route to be travelled by the vehicle 1, in the vicinity of the vehicle 1 in front of the cab 4 (considering the direction of travel); and/or
- the actual position of the vehicle 1 along said route.

In the embodiment shown in FIG. 1, the above information is detected by a detection system 20 on board the vehicle 1. Preferably, the detected information is information at least indicative of the presence/absence of the conductor cable 14. In fact, the control system 18 comprises at least one detection device 20 which is arranged on board the vehicle 1 and configured to detect and/or determine the presence/absence of the conductor cable 14 and so as to emit a corresponding signal towards the control unit 16.

Figure 3:
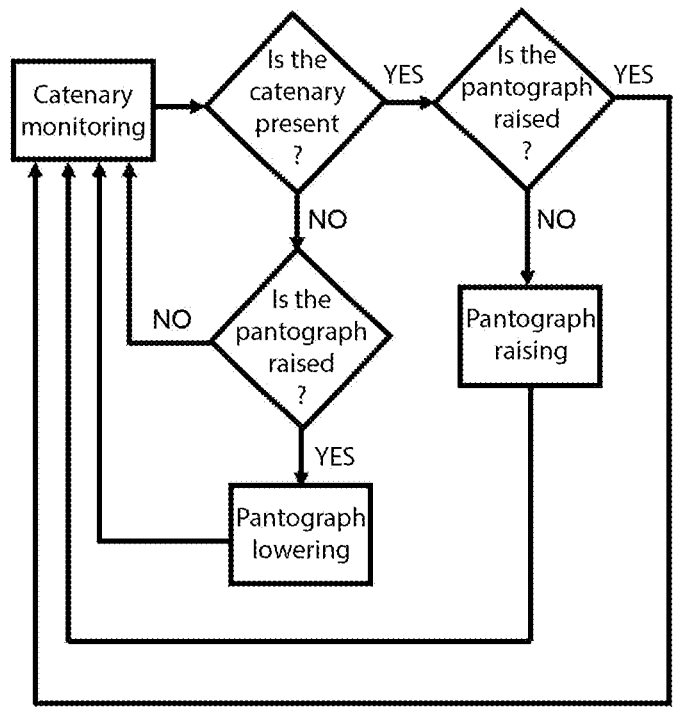
FIG. 3 is a block diagram relating to the operation of the control system in FIG. 2.

The device 20 and/or the control system 18 are active and operate independently of the position of the vehicle 1, as shown schematically in FIGS. 2 and 3. In a preferred embodiment of the invention, as indicated in the diagram in FIG. 6, the unit 16 is programmed so as to control the automatic raising and/or lowering of the pantograph 10 only when the vehicle 1 is stationary or coasting (to prevent the ignition of an electric arc), that is, without there being a transfer of energy to or from the conductor cable 14 for traction purposes.

In other words, the movement of the pantograph 10 preferably takes place when the vehicle is stationary or coasting, i.e., moving by inertia, without drawing energy from the catenary through the pantograph 10, for safety reasons due to the need to avoid dangerous electric arcs.

For example, when the detection system 20 determines/detects the passage from an electrified section to a non-electrified one (or vice versa), the unit 16 is programmed so as to control the automatic raising or lowering of the pantograph 10 at a station or stop along the line. On the other hand, preferably, to start drawing energy from the catenary while the vehicle is moving, the unit 16 first commands the deactivation of the power supply by the additional source 15 so as to travel by inertia, i.e., in coasting conditions, then commands the raising of the pantograph 10 and immediately afterwards commands the activation of the power supply by the pantograph 10 to resume the traction on wheels.

Similarly, to detach the vehicle from the catenary while the vehicle is moving, preferably, the unit 16 first commands the deactivation of the power supply by the pantograph 10 so as to travel by inertia, then commands the lowering of the pantograph 10 and immediately afterwards commands the activation of the power supply by the additional source 15 to resume the traction on wheels.

With reference again to FIGS. 1 to 3, the detection device 20 comprises at least one camera 22, which is pointed upwards and forward (beyond the end of the vehicle 1), towards a position or space where the catenary is provided, so as to visually monitor this space and therefore be able to check, by means of suitable control logic, the absence or presence of the conductor cable 14, as will be described in greater detail below.

Preferably, the camera 22 is arranged outside the vehicle 1, for example on the roof 11 or on the driver's cab 4, to detect images that are as sharp as possible. In particular, the camera 22 is arranged at one end of the carriage 2.

In the particular example shown herein, the vehicle 1 is bi-directional, so that the device 20 comprises two cameras 22 arranged at the opposite ends of the vehicle 1, respectively, i.e., one at the head and the other at the tail. The signals coming from the capturing by the two cameras 22 can be used alternatively to each other according to the actual direction of travel of the vehicle 1. According to variants, not described in detail, the signals coming from the capturing by the two cameras 22 can be used in combination with each other, for example to check and identify possible errors in the detection of the conductor cable 14 and/or in the transmission of the signals to the unit 16.

In particular, each camera 22 is arranged in a fixed position. The camera 22 monitors a certain depth of space along the line/route, in front of the driver's cab 4. The maximum depth that can be monitored essentially depends on the technical and construction features of the camera, whereas the depth actually taken into account for the video-analysis described below will depend on the settings of the monitoring and data processing software.

As shown in FIG. 2, the device 20 preferably comprises, for each camera 22, a respective lighting device 24 pointed towards the same position or space where the corresponding camera 22 is pointed, so as to illuminate the catenary if the vehicle 1 is in an electrified section of the line. The lighting device 24 can emit light with a wavelength within the range visible to the human eye and/or light with a wavelength in the infrared to facilitate the detection operations during the night hours (similarly, the camera 22 can also be chosen so as to detect radiation in the infrared range).

The device 20 comprises, for each camera 22, a respective DSP (Digital Signal Processor), which receives the images captured by the respective camera 22 and communicates with the control unit 16. According to a variant, not shown, the DSP is integrated into the control unit 16.

The DSP is programmed by suitable software (known in the literature) so as to adjust the light intensity of the respective lighting device 24, as a function of at least one index relating to the quality of the images captured by the camera 22, in order to obtain images that are as sharp as possible and thus facilitate the subsequent processing of these images.

Moreover, preferably, the DSP is also configured by suitable software (known in the literature) so as to process the images received by the respective camera 22, wherein such processing comprises at least one of the following two operations:
  elimination of any noise;
  enhancement of details in the images.

This optional processing is followed by the following operation:
  extraction of information from the images.

During the noise elimination operations, the captured image is subjected to video analysis techniques, to facilitate the subsequent extraction of information. In particular, these video analysis techniques give information on average brightness and contrast of the image by using algorithms known in the literature (for example, calculation of the histogram of the pixels). This analysis, as mentioned above, allows the lighting device 24 to be adjusted appropriately.

Subsequently, an image transformation is applied by using low-pass filters known in the literature (for example, Gaussian filters), in order to eliminate small details from the image, while preserving the most important structures.

During the detail enhancement operations, the image is segmented, i.e., the spatial domain of the image is divided into significant subsets (regions), separated from each other by curves (contours). The segmentation step has the purpose of producing an intermediate image starting from an image that is a pictorial representation of the scene. In the intermediate image obtained, the contours and/or regions of the objects in the scene are highlighted. In particular, in order to identify the catenary conductor cable 14 in the image, two different segmentation techniques (known per se in the literature) can be used:
  Edge detection: in the area of the image in which the catenary is present there are sudden changes in intensity at the significant contours of the catenary; the points of the contour are called "edge points" and are searched for by using differential operators (the algorithms used for this technique are known in the literature: for example, Canny's algorithm and its variants, or the Sobel operator is applied);
  Extraction of homogeneous regions: homogeneous regions are identified by the fact that points belonging to the same region have similar grey levels; the classification of the points can be done globally (threshold-based techniques) or locally (region growing techniques) and allows the identification of background portions (for example, the sky).

After the segmentation, as mentioned above, an intermediate image is available in which the basic structures have been highlighted (i.e., a synthetic geometric representation is obtained).

The information extraction operations are then carried out: knowing the shape of the catenary a priori, it is possible to search for the presence of that shape in the segmented image by using shape matching techniques, also known in the literature.

These techniques evaluate the matching, i.e., the correspondence between what is contained in the captured image (and then optionally processed) and a given reference or template, which represents the catenary. The template is defined by information contained in a memory (not shown) communicating with the DSP and/or with the control unit 16.

The matching is then assessed by comparing the processed images from the capturing by the camera 22 with the template. Preferably, this comparison is carried out by also varying the orientation and the dimensions of the same template. The comparison is carried out by using rapid search methods, also known in the literature and based, for example, on a sub-template defined by a portion or a subset of salient points of the template defined a priori: a first comparison is performed to search for the sub-template in the image coming from the capturing by the camera 22, and then the entire template is search for only at those points exhibiting a good degree of matching with the sub-template.

As a further example of a shape matching technique, already described above, the Hough transform can be applied for the recognition of straight lines, for example vertical lines, within the image; in fact, in its classical form, the Hough transform allows the recognition of the lines of an image; it can also be generalized to be applied to the case of a cloud of three-dimensional points and therefore also applied to 3D frames generated/captured by a LIDAR. After applying this transform, the pairs of lines found in the captured image that are parallel and move in the direction of travel of the vehicle are identified and/or selected.

At the end of the aforementioned information extraction operations, the DSP and/or the control unit 16 has/have established whether the catenary is present or absent in the captured images. In practice, the software implemented in the DSP of the device 20 and/or in the control unit 16 makes it possible to analyse the detected images, in particular to discriminate between the detected lines and/or pairs of lines, and therefore to recognize the presence or absence of the conductor cable 14.

Preferably, as shown in FIG. 2, the control unit 16 communicates with the control panel 5 to receive and/or provide information.

Therefore, once the above-mentioned conditions have been determined, the control unit 16 communicates with the device 12 to control the raising or lowering of the pantograph 10; in case of lowering, the unit 16 then switches the power supply so as to operate the electric drive motors 8 by the additional source 15. Moreover, the control unit 16 preferably receives signals relating to the state/position of the pantograph 10, from appropriate sensors (not shown) forming part of the device 12.

Therefore, the control unit 16:
- determines whether the position of the pantograph 10 is lowered or raised, for example, by means of the signals supplied by said sensors of the device 12;
- activates the catenary monitoring, so as to receive information from the device 20 on the presence/absence of the conductor cable 14;
- discriminates between the information received by the two DSPs of the device 20, if necessary, on the basis of the direction of travel of the vehicle 1 (for example, the information on the direction of travel can be implicitly provided by the driver, who enables the control panel 5 on which he/she intends to operate);
- changes or maintains unchanged the position of the pantograph 10, based on the detection of the presence/absence of the conductor cable 14 and the detection of the actual position of the pantograph 10; in particular, the control unit 16 is configured to implement the procedure represented in the block diagram in FIG. 3;
- sends a command to power the electric drive motors 8 via the additional source 15 when the pantograph 10 has been lowered.

In this procedure, if the image processing shows a permanence of the catenary 14 in the next metres of the route, and the pantograph 10 is already raised, then it is not necessary to move it and consequently there is no need to switch the power supply.

When the vehicle 1 is along an electrified section with the pantograph 10 raised, if the image processing shows the absence of the catenary in the following metres of the route, then the control unit 16 controls the device 12 by lowering the pantograph 10.

When the vehicle 1 is on a non-electrified section, with the pantograph 10 lowered (and, in particular, with the electric drive motors powered by the additional source 15), if the image processing shows the presence of the catenary in the following metres of the route, then the control unit 16 controls the device 12 so as to raise the pantograph 10 and then power the electric drive motors 8 by means of energy taken from the conductor cable 14.

Lastly, if the image processing continues to show the absence of the catenary and the pantograph 10 is already in the lowered position, then no action is required.

From the above, it appears that the control system 18 of the present invention allows the lowering/raising of the pantograph 10 of a tram in an autonomous and automatic manner, without informing the driver, at the beginning of the route, at which points of the line these lowering/raising operations must be carried out.

This result is advantageous not only on traditional design tram vehicles but also in the perspective of a vehicle with autonomous driving capability (a driverless vehicle).

Advantageously, according to a variant, the control system 18 can send an authorization request to a driver, for example via the control panel 5, when an action for modifying the position of the pantograph 10 is required: this action is then actually carried out by the control system 18 only after receiving such authorization, in an assisted driving configuration.

Figure 6:
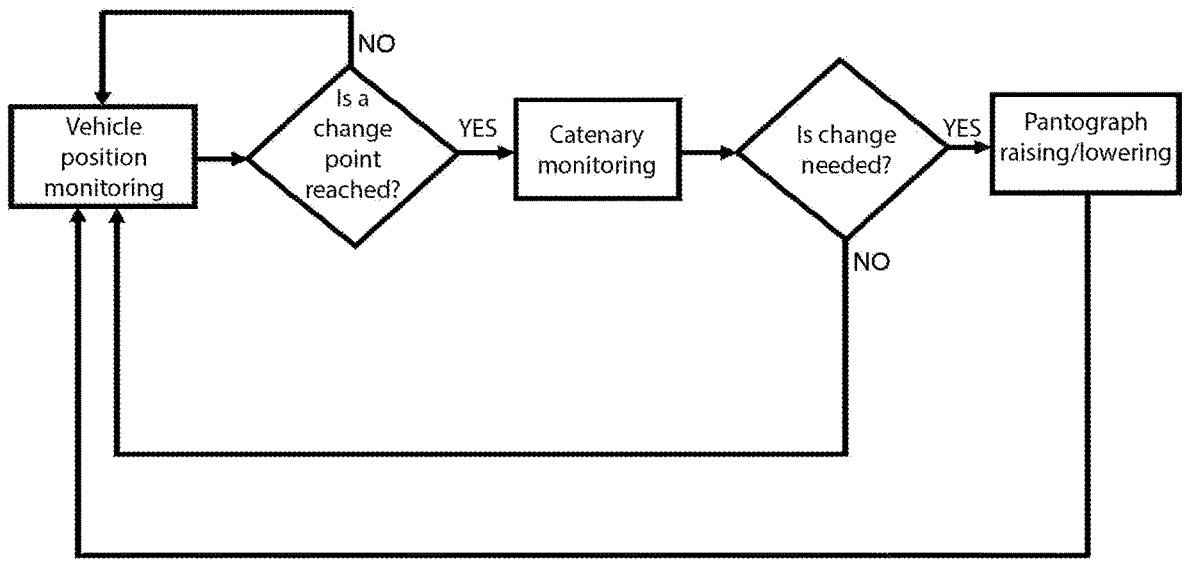
FIG. 6 is similar to FIGS. 3 and 5 and relates to a variant of the previous embodiments.

In the variant of FIG. 6, preferably, in addition to having information on the absence or presence of the catenary conductor cable 14 in the vicinity of the vehicle 1, the control unit 16 communicates with a device for detecting and/or monitoring the position of the vehicle (such as, for example, the device 20a described below).

The device 20 is in standby mode, until the device (20a) that detects/monitors the position of the vehicle sends a warning or consent signal to communicate to the control unit 16 that the vehicle 1 is stationary and/or is at one of the programmed stops along the line and/or that, although being in motion, is at a programmed point where the pantograph needs to be moved. In response to this consent signal, the control unit 16 activates the device 20 and/or starts to analyse the information coming from the device 20. Once the procedure in FIG. 3 has been completed, the control unit 16 communicates again with the device (20a) that monitors the position of the vehicle, until the following stop or programmed point is reached; in other words, up to this new stop or programmed point, the device 20 can go back to standby mode.

This operating logic is to be considered as a double consent procedure, as regards the raising of the pantograph 10, so as to increase the safety level of the manoeuvre. On the other hand, in case of lowering of the pantograph 10, preferably, the camera 22 continues to monitor the catenary conductor cable 14, and the lowering procedure is activated when a consent is obtained by at least one of the two monitoring systems, i.e., the vehicle positioning monitoring system or the catenary monitoring system.

According to variants, not shown, instead of or in combination with the camera 22, the device 20 could comprise a RADAR (RAdio Detection And Ranging) device or a LIDAR (Light Detection and Ranging or Laser Imaging Detection and Ranging) device.

Algorithms for the analysis of the information acquired via the RADAR/LIDAR devices and the verification of the presence/absence of the catenary are also known in the technical literature.

The use of at least one LIDAR device is particularly advantageous, with respect to the use of cameras, since LIDAR devices are also able to measure the distance and reflectivity of scanned objects. In case of detection by a LIDAR device, the latter captures a sequence of so-called "frames": the LIDAR device scans the scene in front of it, with a certain Field of View (FOV) defined by a horizontal angle and a vertical angle; the result is not an array of pixels, as for the camera, but a cloud of points in a three-dimensional space (3D frame), where each point is characterised by a relative distance from the LIDAR device and/or by a relative value of the reflectivity coefficient.

Optionally, a so-called decimation of the points is performed, i.e., a technique is implemented for "creaming off" the acquired points and therefore simplifying the following processes.

Given the position and orientation of the LIDAR device and knowing a priori the area in the surrounding space where the catenary should theoretically be located, the approximate theoretical distance at which the catenary should be located is calculated; similarly, if the materials that make up the catenary are known, it is possible to define a theoretical reflectivity coefficient value that characterises the catenary itself.

The information relating to the theoretical distance between the catenary and the LIDAR device and/or relating to the theoretical reflectivity of the catenary is compared with the distance and/or reflectivity data actually detected by the LIDAR device. Those points that have been detected and have a distance close to the theoretical one, and/or a reflectivity close to the theoretical one, form a set of points that can potentially represent the catenary.

At this point, shape matching algorithms (known in the literature, as also explained above), for example, techniques based on the Hough transform, search for thread-like objects (similar to the catenary conductor cable 14) in the processed 3D frame, which are oriented in the direction of travel, so as to ascertain whether or not the catenary is actually present.

Figure 4:
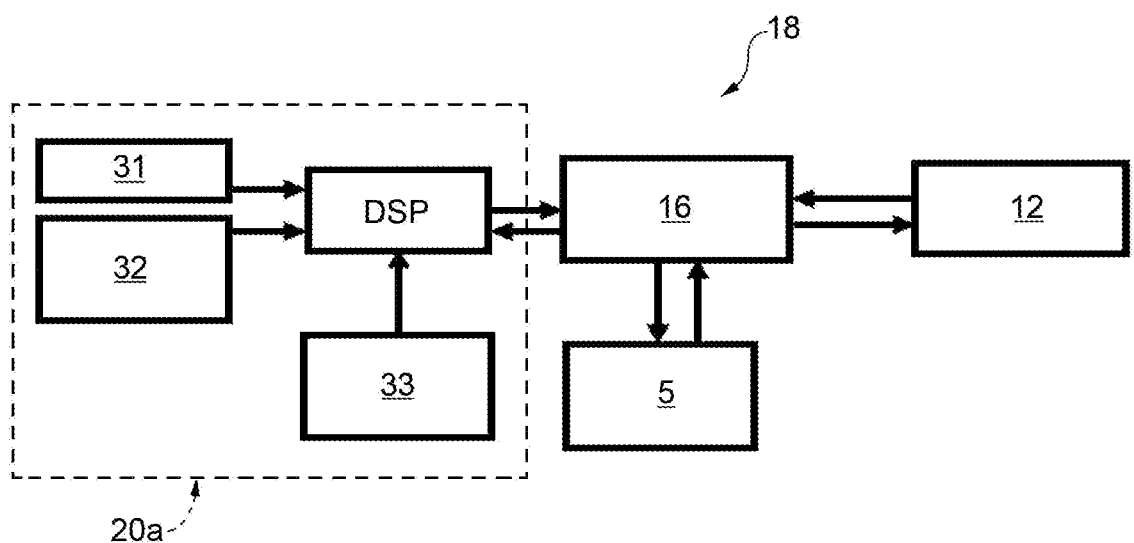
FIG. 4 is similar to FIG. 2 and schematically shows the control system of a second preferred embodiment of the railway vehicle according to the present invention.

According to the embodiment in FIG. 4, the control system 18 of the present invention, instead of being based on software processing performed on the detections of the device 20 to determine the presence/absence of the catenary, operates on the basis of two types of information:

knowledge of the line, with information set at the beginning of the service (i.e., information relating to stops and/or positions where a catenary interruption occurs, i.e., where there is a transition between electrified sections of the line and non-electrified sections of the line); this information is contained in a special memory (not shown) arranged on board the vehicle (or is communicated by a remote control unit to the control unit 16 of the vehicle 1 in wireless mode);

detection of the actual position of the vehicle 1, determined by means of a position detection and/or monitoring device 20a arranged on board the vehicle 1 (or communicated to the control unit 16 in wireless mode by a remote control unit and established by means of suitable sensors arranged along the line).

In other words, by knowing a priori the exact position of the transition points of the line where the pantograph 10 is to be raised/lowered, it is not strictly necessary to monitor the catenary by means of the device 20, but it is sufficient to know the actual position of the vehicle 1.

The device 20a operates on the basis of one or more signals sent by at least one odometer 31 (for example, provided on the trolleys 6), and/or sent by a satellite navigator 32, and/or sent by an inertial platform 33 (with accelerometers, gyroscopes, etc.). The device 20a comprises a DSP (Digital Signal Processor) which, on the basis of the aforementioned signals, is programmed to define the position of the vehicle 1 along the line.

The control unit 16 interfaces with the device 20a and with the device 12, and preferably also with the control panel 5.

Figure 5:
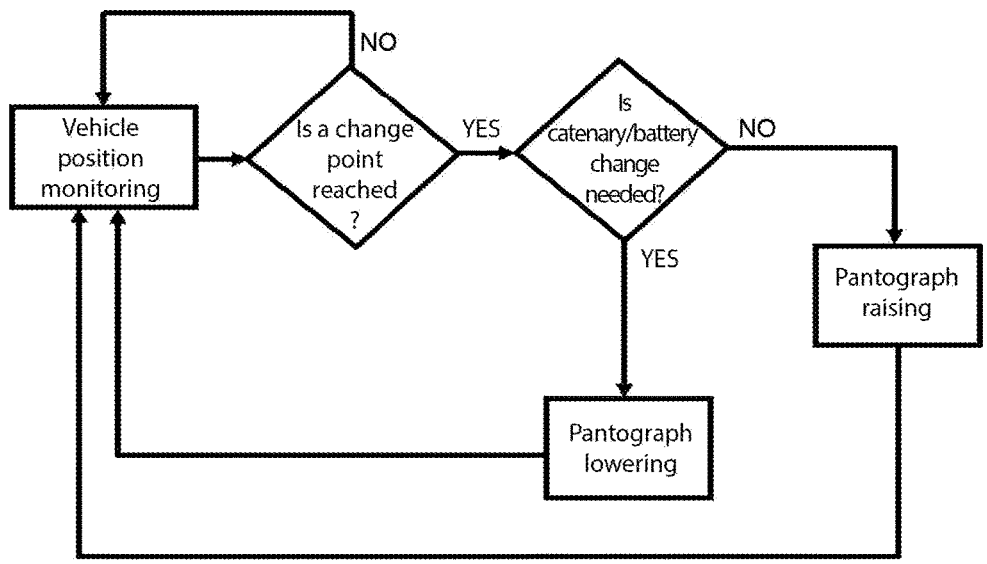
FIG. 5 is similar to FIG. 3 and shows a block diagram relating to the operation of the control system in FIG. 4.

In particular, the control unit 16 is configured to determine the distance of the vehicle 1 from the next position (for example a stop) in which it will be necessary to raise or lower the pantograph 10. As shown in FIG. 5, once the control unit 16 has determined that this position has been reached and with information indicative of the type of power variation expected on the line (from catenary to battery or vice versa), the control unit 16 will suitably control the device 12. The control unit 16 is therefore responsible for implementing the block diagram of FIG. 5.

In other words, the control unit 16 receives the information determined a priori relating to the line (for example, the position where transitions are expected between sections in which the catenary is present and sections in which the catenary 14 is absent, and/or the position of the stops where the pantograph 10 is to be raised/lowered), receives the information on the actual position of the vehicle 1 from the device 20a, compares the two pieces of information and consequently activates the device 12 to raise/lower the pantograph 10.

In addition, the control unit 16 sends a confirmation message to the control panel 5 once the operation has been completed.

With reference to FIG. 4, the satellite navigator 32 is generally not sufficient to guarantee constant monitoring of the position of the vehicle 1, since there may be no guarantee of satellite coverage over the whole line (for example, due to the crossing of a tunnel) and/or satellite signal reception. Therefore, the device 20a also makes use of the information detected by the inertial platform 33 and the odometer 31. The information detected by these three detection systems (satellite navigator, inertial platform and odometer) is sent to the DSP which implements suitable data-fusion algorithms, known in the literature, in order to correlate said pieces of information and obtain an accurate overall result as regards the information on the actual position of the vehicle 1.

According to a further variant, not shown, the control unit 16 controls the actuation of the device 12 only after sending an authorization request to the control panel 5 and receiving a corresponding consent from the driver.

The advantages of the control system 18 provided for deciding where and when it is necessary to raise and lower the pantograph 10, without the driver intervening for this decision, are clear from the foregoing.

In particular, with the device 20 and/or the device 20a and/or the memory containing the data relating to the line placed on board, it is possible to avoid sending signals and/or information to the vehicle 1 from the outside, thus avoiding risks from defects in the transmission of the data and of said information. The device 20 and/or the device 20a provide the control unit 16 with a clear indication of the need to raise/lower the pantograph 10, with no decisions or interpretations made by the driver, since it is the control unit 16 that determines whether it is necessary to control the device 12. Moreover, the device 12 could be controlled by the control unit 16 even without the need for any consent or verification by the driver.

Furthermore, the solutions described above are not particularly burdensome from the point of view of the costs and the number of components to be installed on board.

Lastly, from the above it is clear that modifications and variations may be made to the vehicle 1 described above with reference to the attached figures without departing from the scope of protection of the present invention, as defined in the appended claims.

In particular, the control system 18 of the present invention could be applied not only to trams, but also to trains which have to travel along certain sections (for example, city sections) without a catenary.

Moreover, the present invention can be applied not only to the raising and lowering of a pantograph, but also to the movement of a shoe provided for picking up electrical energy from an electrified track placed on the ground (instead of from an overhead electrified line), which performs the same technical function as the conductor cable 14. In other words, the pantograph and said shoe both define an element for picking up energy, which is movable (in particular, movable in height, i.e., it can be raised/lowered) between a first position, in which the element for picking up energy is in contact with the conductor of the electrified line, and a second position, in which it is spaced apart from the position where said conductor is provided.

The invention claimed is:

1. A railway vehicle (1) comprising:
   electric drive motors (8);
   an element for picking up energy (10) movable between
      a first position, wherein the element for picking up energy (10) is suitable to cooperate in contact, in use, with a conductor element (14) of an electrified line to draw electrical energy and supply such electrical energy to said electric drive motors, and
      a second position, wherein the element for picking up energy (10) is spaced apart from the position where, in use, said conductor element (14) is provided;
   an additional electrical energy source (15);
   a moving device (12) for moving said element for picking up energy (10) between said first and second positions;
   a control system (18) for controlling said moving device (12) and, therefore, for moving said element for picking up energy (10);
   said control system (18) comprising:
   a first detection device (20) arranged on board and comprising at least one detector, which is defined by one of a camera, a LIDAR device, a RADAR device, and is pointed towards a space where, in use, said conductor element (14) is provided along the route, so as to detect and supply data relating to objects possibly present in said space; and
   at least one control unit (16) configured to control said moving device (12) in response to the data detected and supplied by said detector;
   said control system comprising processing means configured to determine the presence or absence of said conductor element (14) in the vicinity of the vehicle (1) along a route of the vehicle (1), starting from said data; said control unit (16) being configured to control said moving device (12) in response to the presence or absence of said conductor element (14) determined by said processing means, and so as to provide power supply to said electric drive motors (8) by said additional source (15) when said element for picking up energy (10) is in the second position;
   characterised in that
   said detector is pointing upwards and forward, beyond an end of the vehicle (1);
   said control unit (16) is configured to control said moving device (12) and move the element for picking up energy (10) into the second position if the processing means show the absence of said conductor element (14) in the following metres of the route, when the vehicle (1) is along an electrified section of the route with the element for picking up energy (10) arranged in the first position.

2. The vehicle according to claim 1, characterised in that said control unit (16) is configured to control said moving device (12) so as to move said element for picking up energy (10) when the vehicle is stationary or coasting.

3. The vehicle according to claim 1, characterised in that said detector is defined by a camera (22); said first detection device (20) further comprising at least one lighting device (24) pointed towards the space where, in use, said conductor element is provided along said route.

4. The vehicle according to claim 3, characterised in that said first detection device (20) comprises a first processor configured to adjust said lighting device (24) in response to images captured by said camera (22).

5. The vehicle according to claim 1, characterised in that said detector is defined by a LIDAR device for detecting 3D frames.

6. The vehicle according to claim 1, characterised in that said control unit (16) is configured to control a movement of said element for picking up energy into the first position, in the presence of a first consent and a second consent; the first consent being based on information indicative of the actual position of the vehicle (1), and the second consent being based on the data detected and supplied by said detector.

7. The vehicle according to claim 1, characterised in that said control unit (16) is configured to:
   receive signals indicative of the position of said element for picking up energy (10) and
   control said moving device (12) in response to said signals.

8. The vehicle according to claim 1, characterised in that said processing means are configured to determine the presence or absence of said conductor element (14) by implementing shape matching techniques.

9. The vehicle according to claim 1, characterised in that said processing means are configured to determine the presence or absence of said conductor element (14) by:
   applying the Hough transform to recognize straight lines within camera images or within 3D frames of the LIDAR device; and
   locating and/or selecting pairs of parallel straight lines recognized in the images or 3D frames.

10. The vehicle according to claim 1, characterised in that said first detection device comprises two detectors, which are arranged at the head and tail of the vehicle, respectively, and are pointed towards substantially opposite directions; said control unit being configured to process the information received from one or the other of the two detectors according to the direction of travel of the vehicle.

11. The vehicle according to claim 1, characterised in that said control system (18) comprises a second detection device (20*a*) arranged on board and configured to determine the actual position of the vehicle (1) along said route and supply said control unit (16) with corresponding information.

12. The vehicle according to claim 11, characterised in that said second detection device (20*a*) comprises:
   a satellite navigator (32),
   an inertial platform (33),
   an odometer (31), and
   a second processor configured to correlate the information provided by said satellite navigator (32), said inertial platform (33) and said odometer (31) and, consequently, obtain overall information on the actual position of the vehicle (1).

* * * * *